(12) United States Patent
Miyamura et al.

(10) Patent No.: US 6,995,941 B1
(45) Date of Patent: Feb. 7, 2006

(54) METHOD FOR IMPROVING HEAD POSITION DETERMINATION IN A DISK DRIVE

(75) Inventors: Masao Miyamura, Diamond Bar, CA (US); David Dung Tien Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/031,616

(22) Filed: Jan. 7, 2005

(51) Int. Cl.
*G11B 21/02* (2006.01)

(52) U.S. Cl. ....................................................... 360/75

(58) Field of Classification Search ................. 360/75, 360/48, 77.08, 77.12
See application file for complete search history.

(56) References Cited

U.S. PATENT DOCUMENTS

| | | | | |
|---|---|---|---|---|
| 5,345,342 A | * | 9/1994 | Abbott et al. | 360/48 |
| 5,587,850 A | * | 12/1996 | Ton-that | 360/77.08 |
| 5,796,543 A | * | 8/1998 | Ton-That | 360/77.08 |
| 6,005,738 A | * | 12/1999 | Chainer et al. | 360/75 |
| 6,249,399 B1 | * | 6/2001 | Chainer et al. | 360/75 |
| 6,301,071 B2 | * | 10/2001 | Chainer et al. | 360/75 |
| 6,426,846 B1 | * | 7/2002 | Chliwnyj et al. | 360/77.12 |
| 6,462,899 B1 | * | 10/2002 | Chliwnyj et al. | 360/77.12 |
| 6,525,898 B1 | * | 2/2003 | Chliwnyj et al. | 360/77.12 |

* cited by examiner

*Primary Examiner*—David Hudspeth
*Assistant Examiner*—Fred F. Tzeng
(74) *Attorney, Agent, or Firm*—Robroy R. Fawcett, Esq.

(57) ABSTRACT

A method is disclosed for improving head position determination in a disk drive having a transducer head and a rotating disk with a plurality of embedded servo wedges for defining a plurality of concentric data tracks. Each servo wedge has a plurality of servo bursts for providing radial track position information. In the method, the servo bursts within a servo wedge are read and a burst amplitude is determined for each servo burst. The burst amplitudes are compared to determine a radial servo position zone. A fine radial head position within the radial servo position zone is determined based on a ratio having a numerator consisting of an algebraic sum and difference of the burst amplitudes and a denominator consisting of an algebraic difference between a largest burst amplitude and a smallest burst amplitude.

21 Claims, 7 Drawing Sheets

METHOD FOR IMPROVING HEAD POSITION DETERMINATION IN A DISK DRIVE

BACKGROUND OF THE INVENTION

1. Field of the Invention

The present invention relates to disk drives, and more particularly, to a technique for improving head position determination in a disk drive, particularly near a quarter track location or a servo zone boundary.

2. Description of the Prior Art and Related Information

In order to remain competitive, disk drive manufacturers must continually provide increased data storage capacity while rigidly controlling disk drive manufacturing cost. One key to increased storage capacity is increased track density, often expressed as tracks per inch or TPI. Market demand for increased storage capacity has pushed disk drive designers to increase the TPI of disk drives, thereby increasing the demands for accurate determination of the position of the disk drive's read/write head in disk operations.

Accordingly, there exists a need for a method that improves the determination of the head's position in a disk drive without unnecessarily impacting the disk drive's storage capacity or increasing the disk drive's manufacturing cost.

SUMMARY OF THE INVENTION

The present invention may be embodied in a method for improving head position determination in a disk drive having a transducer head and a rotating disk with a plurality of embedded servo wedges for defining a plurality of concentric data tracks. Each servo wedge has a plurality of servo bursts for providing radial track position information. In the method, the servo bursts within a servo wedge are read and a burst amplitude is determined for each servo burst. The burst amplitudes are compared to determine a radial servo position zone. A fine radial head position within the radial servo position zone is determined based on a ratio having a numerator consisting of an algebraic sum and difference of the burst amplitudes and a denominator consisting of an algebraic difference between a largest burst amplitude and a smallest burst amplitude.

In more detailed features of the invention, the plurality of servo bursts within the servo wedge may comprise four servo bursts for each set of an odd data track and an even data track. The four servo bursts may generate first, second, third and fourth burst amplitudes. The first burst amplitude may be greater than the second burst amplitude, the second burst amplitude may be greater than the third burst amplitude, and the third burst amplitude may be greater than the fourth burst amplitude, such that the first burst amplitude is the largest burst amplitude and the fourth burst amplitude is the smallest burst amplitude. The algebraic sum and difference of the burst amplitudes of the numerator may consist of the first burst amplitude plus the third burst amplitude minus the second burst amplitude and minus the fourth burst amplitude. Alternatively, the algebraic sum and difference of the burst amplitudes of the numerator may consist of the second burst amplitude plus the fourth burst amplitude minus the first burst amplitude and minus the third burst amplitude. Also, each servo burst may have a circumferential offset for identifying the servo burst and a radial offset for providing radial track position information.

In other more detailed features of the invention, eight radial servo position zones may be associated with each set of an odd data track and an even data track. Four radial servo position zones are associated with each data track.

An alternative embodiment of the present invention may reside in a method for improving head position determination in a disk drive having a transducer head and a rotating disk with a plurality of embedded servo wedges for defining a plurality of concentric data tracks. Each servo wedge may have an A servo burst, a B servo burst, a C servo burst, and a D servo burst, for providing radial track position information. In the method, the servo bursts within a servo wedge are read and a burst amplitude is determined for each servo burst. The burst amplitudes are compared to determine one of eight radial servo position zones. A fine radial head position P1 may be determined within a first radial servo position zone or a fifth radial servo position zone based on the following equation:

$$P1 = K(A - B - C + D)/(-A + B).$$

A fine radial head position P2 may be determined within a second radial servo position zone or a sixth radial servo position zone based on the following equation:

$$P2 = K(A - B - C + D)/(-C + D).$$

A fine radial head position P3 may be determined within a third radial servo position zone or a seventh radial servo position zone based on the following equation:

$$P3 = K(A - B + C - D)/(-C + D).$$

And a fine radial head position P4 may be determined within a fourth radial servo position zone or an eighth radial servo position zone based on the following equation:

$$P4 = K(-A + B - C + D)/(-A + B).$$

In more detailed features of the invention, the constant K may be a position value for a quarter track position. The fine radial head position may be a value between −64 and 64, and K is equal to 64. For comparing the burst amplitudes, the first radial servo position zone may be used if the burst amplitude comparison determines that D>C, B>A and B>D. The second radial servo position zone may be used if the burst amplitude comparison determines that D>C, B>A and B<D. The third radial servo position zone may be used if the burst amplitude comparison determines that D>C, A>B and D>A. The fourth radial servo position zone may be used if the burst amplitude comparison determines that D>C, A>B and D<A. The fifth radial servo position zone may be used if the burst amplitude comparison determines that C>D, A>B and A>C. The sixth radial servo position zone may be used if the burst amplitude comparison determines that C>D, A>B and A<C. The seventh radial servo position zone may be used if the burst amplitude comparison determines that C>D, B>A and C>B. And the eighth radial servo position zone may be used if the burst amplitude comparison determines that C>D, B>A and C<B.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
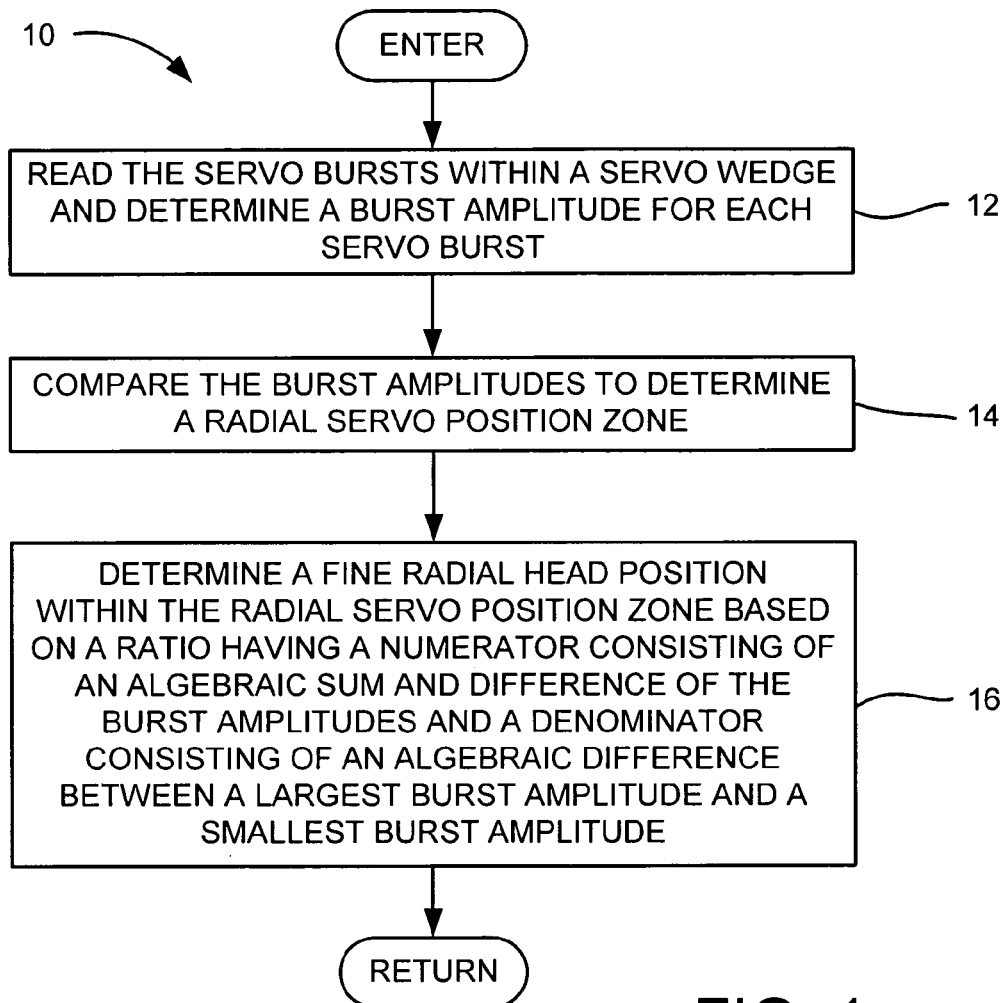
FIG. 1 is a flow diagram illustrating an embodiment of a method for improving head position determination in a disk drive, according to the present invention.
Figure 2:
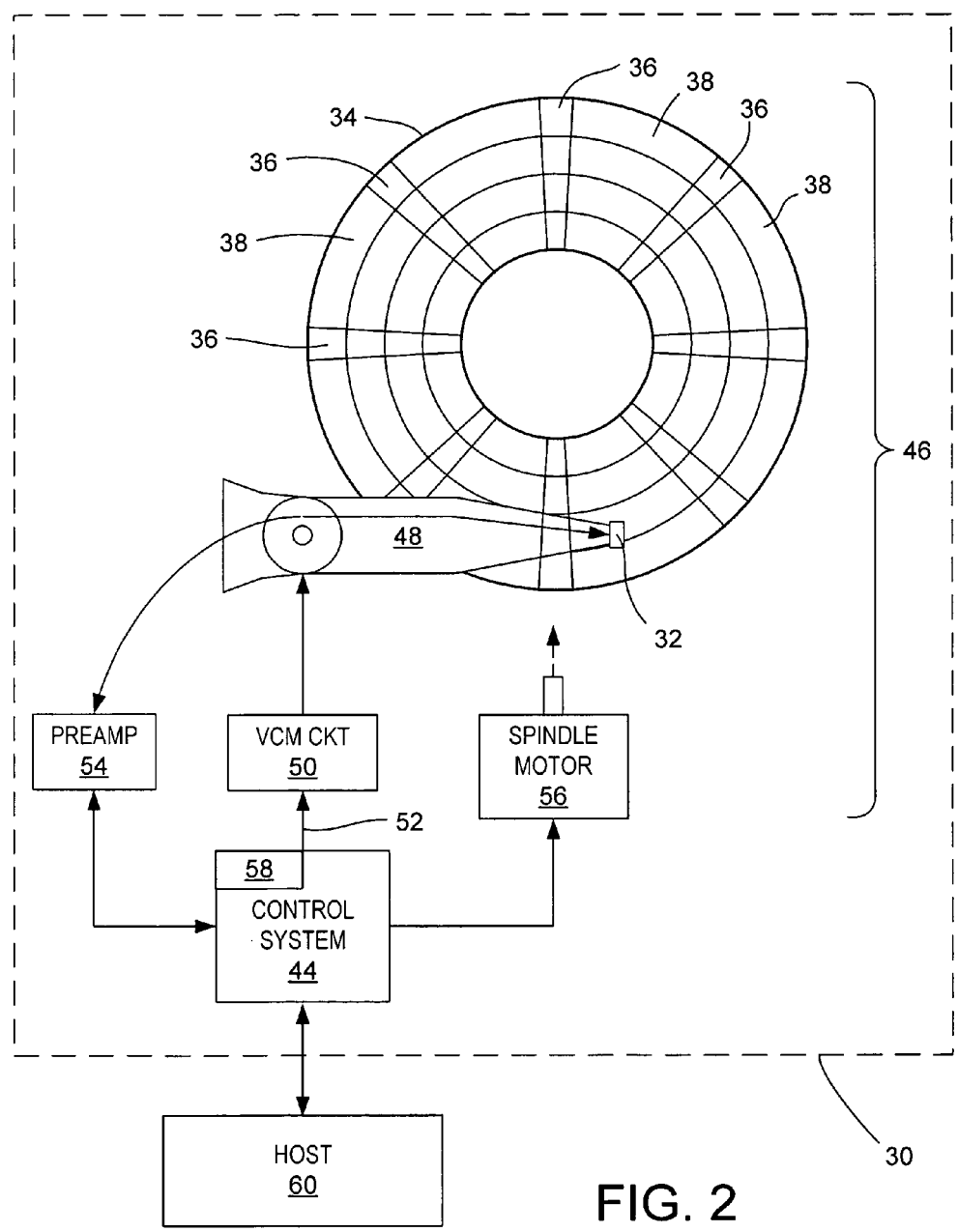
FIG. 2 is a block diagram of a disk drive having improved head position determination by implementing the method of FIG. 1.

With reference to FIGS. 1 through 6, the present invention may be embodied in a method 10 (FIG. 1) for improving head position determination in a disk drive 30 (FIG. 2). The disk drive has a transducer head 32 and a rotating disk 34 with a plurality of embedded servo wedges 36 for defining a plurality of concentric data tracks 38. Each servo wedge has a plurality of servo bursts 40 (FIGS. 3 and 4) for providing radial track position information. In the method, the servo bursts within a servo wedge are read and a burst amplitude is determined for each servo burst (step 12). The burst amplitudes are compared to determine a radial servo position zone ZN (FIGS. 4 and 5) (step 14). A fine radial head position within the radial servo position zone is determined based on a ratio having a numerator consisting of an algebraic sum and difference of the burst amplitudes and a denominator consisting of an algebraic difference between a largest burst amplitude and a smallest burst amplitude (step 16).

Advantageously, the present invention eliminates the need for a calibrated burst gain constant, used in the fine radial head position determination, that may be based on a ratio having a denominator consisting of an algebraic sum of the servo burst amplitudes. An exemplary technique for the fine radial head position determination using a ratio having a denominator consisting of an algebraic sum of the servo burst amplitudes is disclosed in U.S. application Ser. No. 10/903,524, filed Jul. 30, 2004, which application is incorporated herein by reference. It is relatively impractical to generate a calibrated burst gain constant for each track 38 of a disk drive 30. Often, the burst gain constant is measured for a track at an inner diameter, a track at a middle diameter, and a track at an outer diameter, of the disk 34. A second order polynomial equation is fit to the measured burst gain constant and is used for generating the calibrated burst gain constant for all of the tracks on the disk. Inaccuracies in the calibrated gain constant causes discontinuities at burst ratio switching points, e.g., the quarter-track (25%) off-track positions, that are manifest as an increase in a head position variance, and as an apparent nonlinearity that cannot be compensated, near the burst ratio switching points. Eliminating the calibrated gain constant permits reduced head position variance resulting in an improved fine radial head position determination.

Figure 4:
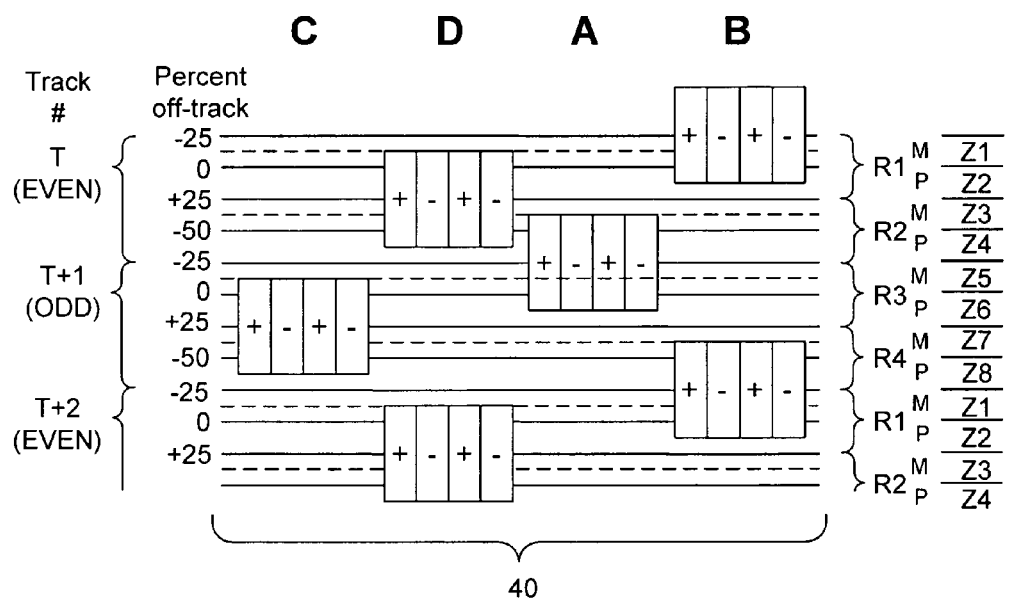
FIG. 4 is a schematic diagram of servo burst patterns for providing track position information and showing radial servo position zones.
Figure 5:
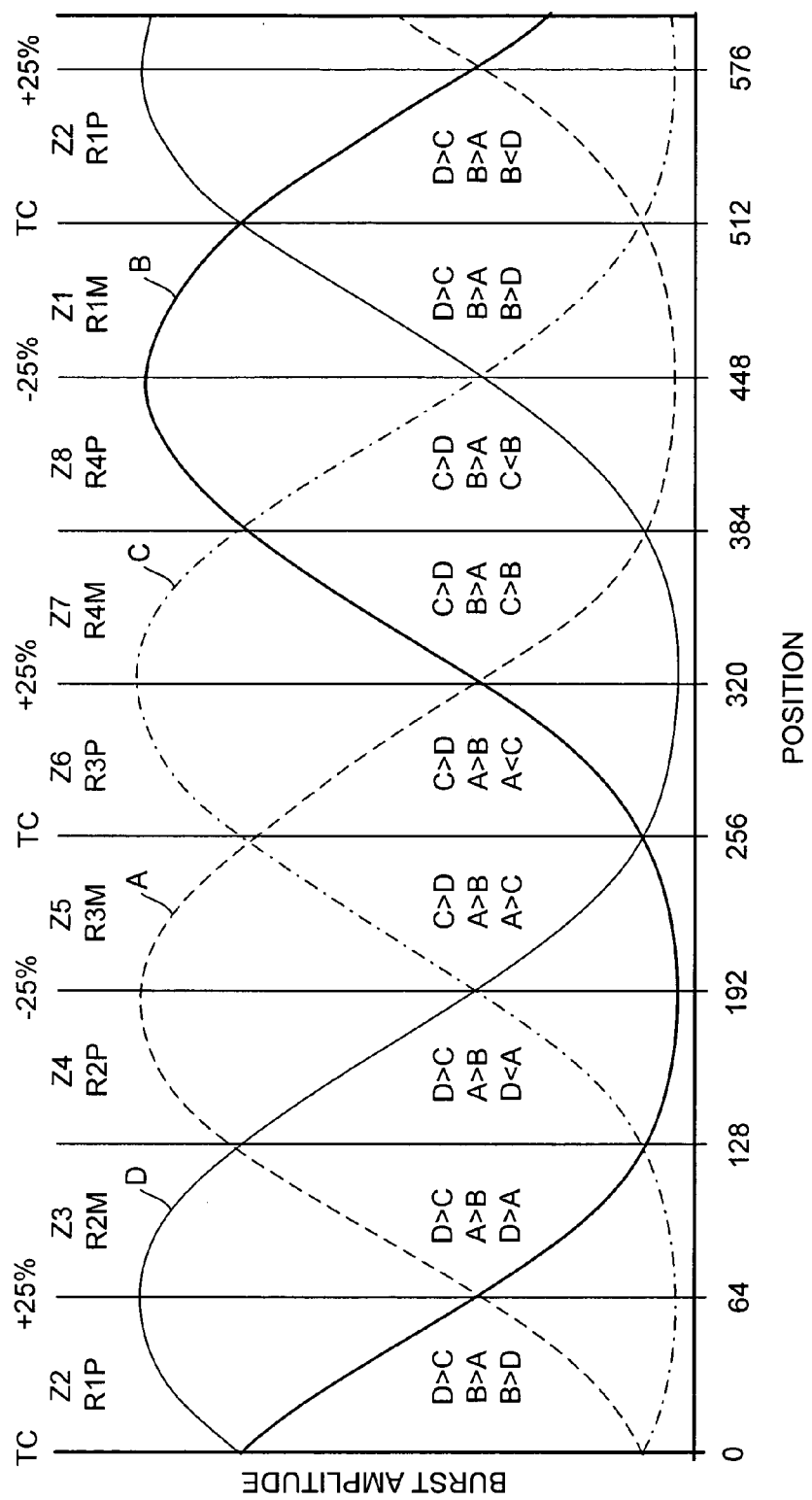
FIG. 5 is a graph of servo burst amplitudes versus position.
Figure 6:
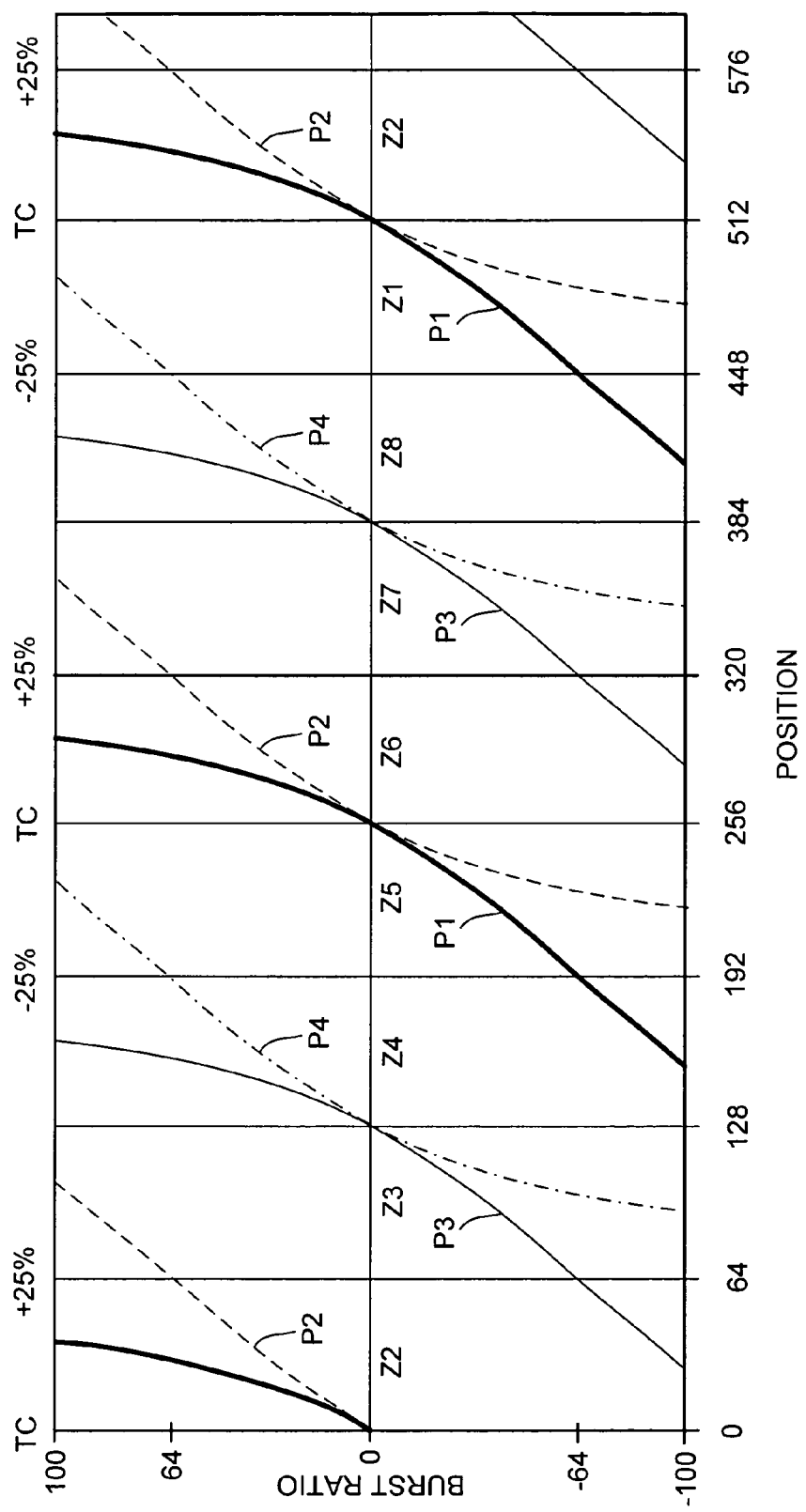
FIG. 6 is a graph of calculated burst ratio versus track position for determining a fine transducer position.

As shown in FIG. 4, the plurality of servo bursts 40 within the servo wedge 36 may comprise four servo bursts, A, B, C and D, for each set of an odd data track T+1 and an even data track T. Each servo burst may have a circumferential offset for identifying the servo burst and a radial offset for providing radial track position information. The servo burst pattern is repeated in a radial direction. The servo wedges are formed by a radial alignment of the servo sectors 42 that define the data tracks 38. As shown in FIG. 5, the four servo bursts may generate four respective servo burst amplitudes. Within the determined radial servo position zone ZN, the burst amplitudes may be referred to as the first, second, third and fourth burst amplitudes. The first burst amplitude is the largest burst amplitude and the fourth burst amplitude is the smallest burst amplitude such that the first burst amplitude is greater than the second burst amplitude, the second burst amplitude is greater than the third burst amplitude, and the third burst amplitude is greater than the fourth burst amplitude. The algebraic sum and difference of the burst amplitudes of the numerator may consist of the first burst amplitude plus the third burst amplitude minus the second burst amplitude and minus the fourth burst amplitude. Alternatively, the algebraic sum and difference of the burst amplitudes of the numerator may consist of the second burst amplitude plus the fourth burst amplitude minus the first burst amplitude and minus the third burst amplitude.

The radial servo position zones ZN may comprise eight zones Z1–8 that may be associated with each set of an odd data track T+1 and an even data track T. Four of the radial servo position zones are associated with each data track.

Figure 7:
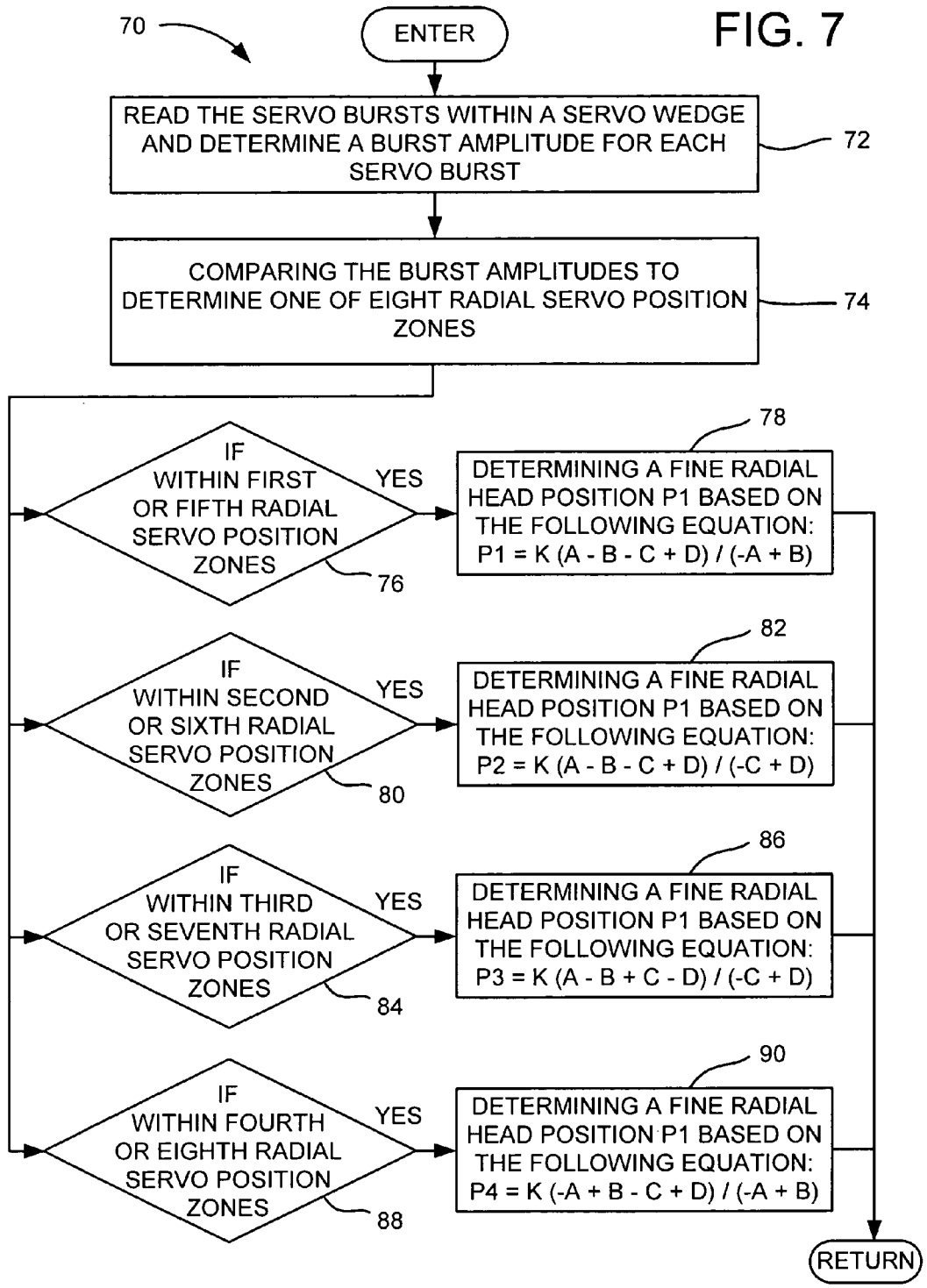
FIG. 7 is a flow diagram illustrating another embodiment of a method for improving head position determination in a disk drive, according to the present invention.

With reference to FIG. 7, an alternative embodiment of the present invention may reside in a method 70 for improving head position determination in a disk drive 30 having a transducer head 32 and a rotating disk 34 with a plurality of embedded servo wedges 36 for defining a plurality of concentric data tracks 38. Each servo wedge may have an A servo burst, a B servo burst, a C servo burst, and a D servo burst, for providing radial track position information. In the method, the servo bursts within a servo wedge are read and a burst amplitude is determined for each servo burst (step 72). The burst amplitudes are compared to determine one of eight radial servo position zones (step 74). A fine radial head position P1 may be determined within a first radial servo position zone Z1 or a fifth radial servo position zone Z5 (step 76) based on the following equation (step 78):

$$P1 = K(A-B-C+D)/(-A+B).$$

A fine radial head position P2 may be determined within a second radial servo position zone Z2 or a sixth radial servo position zone Z6 (step 80) based on the following equation (step 82):

$$P2 = K(A-B-C+D)/(-C+D).$$

A fine radial head position P3 may be determined within a third radial servo position zone Z3 or a seventh radial servo position zone Z7 (step 84) based on the following equation (step 86):

$$P3 = K(A-B+C-D)/(-C+D).$$

And a fine radial head position P4 may be determined within a fourth radial servo position zone Z4 or an eighth radial servo position zone Z8 (step 88) based on the following equation (step 90):

$$P4 = K(-A+B-C+D)/(-A+B).$$

In all cases, the denominator should be checked to insure it is not equal to zero before dividing the numerator by the denominator.

Advantageously, the constant K may be a fine radial head position value corresponding to a quarter track position, i.e., an off-track position that is 25 percent above or below a track centerline TC. The fine radial head position may be a value between −64 and 64, and the constant K is equal to 64. For comparing the burst amplitudes, the first radial servo position zone Z1 may be used if the burst amplitude comparison determines that D>C, B>A and B>D. The second radial servo position zone Z2 may be used if the burst amplitude comparison determines that D>C, B>A and B<D. The third radial servo position zone Z3 may be used if the burst amplitude comparison determines that D>C, A>B and D>A. The fourth radial servo position zone Z4 may be used if the burst amplitude comparison determines that D>C, A>B and D<A. The fifth radial servo position zone Z5 may be used if the burst amplitude comparison determines that C>D, A>B and A>C. The sixth radial servo position zone Z6 may be used if the burst amplitude comparison determines that C>D, A>B and A<C. The seventh radial servo position zone Z7 may be used if the burst amplitude comparison determines that C>D, B>A and C>B. And the eighth radial servo position zone Z8 may be used if the burst amplitude comparison determines that C>D, B>A and C<B.

The disk drive 30 generally comprises a disk control system 44 and a head disk assembly (HDA) 46. The HDA includes the magnetic disk 34 having the plurality of concentric data tracks 38 recorded thereon, the head or transducer 32 for writing user data to or reading user data from a selected one of the data tracks in response to a host command, and an actuator 48 for positioning the transducer over the selected track. The transducer 32 in present disk drives comprises a giant magneto-resistive (GMR) read element and thin film inductive write element. The actuator is typically implemented as a voice coil motor (VCM) circuit 50 which rotates an actuator arm about a pivot in order to position the head radially over the disk in response to control signals 52 from the disk control system. The HDA 46 also includes a preamplifier 54, and a spindle motor 56 for rotating the disk. The head communicates with the disk control system 44 via the preamplifier. The disk control system includes a servo control system 58 that controls the transducer head's position over the disk 34. The servo control system reads track identification information and track position information from a servo sector 42 and uses that information to generate the control signals 52. The disk control system 44 and also includes circuitry and processors that provide an intelligent disk control system interface between a host 60 and the HDA for execution of read and write commands. The disk control system may have, for example, an internal microprocessor and nonvolatile memory. Program code for implementing the techniques of the invention may be stored in the nonvolatile memory and transferred to volatile random access memory (RAM) for execution by the microprocessor. The microprocessor and supporting hardware of the disk drive comprise the means for implementing the functions of the disk drive of the present invention.

The servo control system 58 implements a servo control loop which causes the transducer 32 to follow a desired path (or centerline) of the selected track 38 in an operation generally referred to as "track following." During track following, the path of the head wanders about the desired track path. Typically, the servo control system attempts to limit the head wander to within a predetermined range defined by a "Track Misregistration" (TMR) budget.

A track 38 is selected for track following by applying the reference position corresponding to the selected track at an input of the servo control loop. A position error signal (PES) is generated based on the difference between the reference position and the actual transducer position, which is measured as the transducer 32 passes over a servo sector 42 of the selected track. Nominally, a track following compensator of the servo control system 58 processes the PES and generates the control signal 52 for application to the HDA 46.

Figure 3:
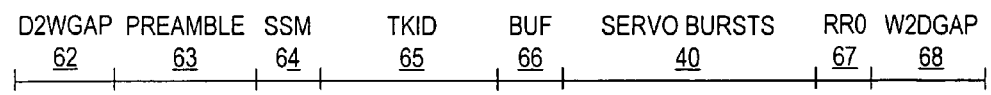
FIG. 3 is a data structure of a typical servo sector providing track identification information for determining a track's number, and providing track position information.

FIG. 3 conceptually presents the servo information that may be written in a servo sector 42, but the relative dimensions of the component fields are not drawn to scale. As shown, each servo sector contains a sequence of fields having various functions relative to locating and reading the servo information and implementing the servo control process. More particularly, each servo sector 42 generally comprises a header region (not separately identified) followed by a servo burst field 40.

The header region fields include a data-to-wedge gap (D2WGAP) (or write splice) field 62, a preamble field 63 (often having an address mark field and an automatic gain control/phase locked oscillator field), a servo sync mark (SSM) field 64, a track identification (TKID) field 65, and a buffer (BUF) field 66. The header region is followed by the servo bursts, e.g. A, B, C, and D, that are circumferentially sequential and radially offset relative to a burst pair centerline. After the servo field 40 is a repeatable runout (RRO) field 67, and a wedge-to-data gap (W2DGAP) field 68.

The data-to-wedge gap D2WGAP field 62 provides a buffer zone to prevent the servo control system 58 from interpreting an erasure within a preceding user data segment as an address mark field. The preamble field 63 provides a stable reference to set the gain of a read channel and "train" a phase lock oscillator to lock on the servo channel frequency. The servo sync mark SSM field 64 provides a unique coded word which synchronizes decoding logic in the disk drive's read channel (not shown) to either byte or word timing boundaries. The track identification TKID field 65 provides a binary coded track address that uniquely identifies an integer servo track position for coarsely moving the head to a desired servo track ("seeking"). The TKID field conventionally uses a gray code to allow for reading track identification fields while sweeping across multiple servo tracks during seek operations. The buffer field 66 provides space between the TKID field 65 and the servo burst field 40. Lastly, the four servo bursts A, B, C, and D provide the servo control system 58 with information needed to determine a fractional track position for keeping the transducer at a desired position relative to a track centerline TC ("track following"). Regarding the designation of bursts as "A", "B", "C", "D" etc., the burst designation and the order of such designated bursts laid down on the disk is arbitrary and may vary from manufacturer to manufacturer. The track centerlines are defined relative to burst pairs. In particular, the B and D bursts define track centerlines that are associated with even track numbers, and the C and A bursts define track centerlines that are associated with odd track numbers.

FIG. 5 shows the amplitude of a signal read from each servo burst, as the transducer passes through the servo burst field 40, with respect to radial position. The first burst read is the "C" burst, then the "D" burst, then the "A" burst, and lastly, the "B" burst. Generally, track numbering begins at the disk's outer diameter (OD) and ends at the disk's inner diameter (ID). For this discussion, a track number T is assumed to have an even value. Advantageously, each track may have two position regions RM, an on-track position region and an off-track position region. For an even number track, the on-track position region may be designated as a first region R1, and the off-track zone may be designated as a second region R2. For an odd numbered track, the on-track position region may be designated as a third region R3, and the off-track position zone may be designated as a fourth region R4. Each position region has a plus (P) position zone and a minus (M) position zone. The eight plus and minus position zones are labeled Z1–Z8, respectively.

Once the position region has been determined, an odd/even property of the track number may be estimated. If the estimated odd/even property for the track number does not match the odd/even property for the track number read from the TKID field, then the estimated track number may adjusted by changing the track number by one track number. The direction of the track number adjustment may be determined by a the fine radial head position.

Figure 8:
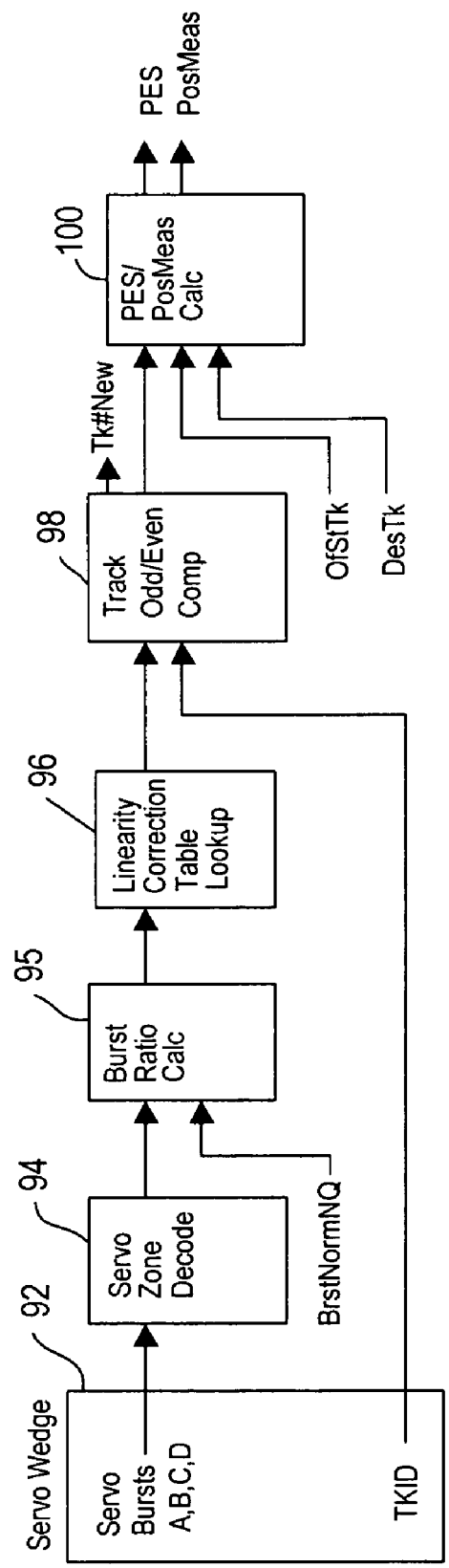
FIG. 8 is a block diagram showing a technique for processing the wedge servo bursts.

The processing of the servo sectors may be described in more detail with respect to FIG. 8. The fine transducer position is determined by combining the burst amplitudes and using a relatively linear portion of the resulting burst ratio curves. A servo sector 42 of a servo wedge 36 is encountered and the TKID and servo bursts are read (block 92). The servo zone is decoded (block 94) and the burst ratio is calculated (block 95). Burst normalization factors Brst-NormNQ may be used in calculating the burst ratio. A linearity correction may be applied to the fine transducer position using a lookup table (block 96). The odd/even property for the track number determined from the track ID is compared with the servo zone odd/even property, and then, if necessary, the track number is adjusted Tk#New (block 98). The PES and measured transducer position is calculated from the fine transducer position, the designated track DesTk, and the track offset OfStTk (block 100). The track offset is applied to the PES to allow track following away from track center and possibly several tracks away from the specified destination. This is primarily for the transducer's writer/reader jog.

What is claimed is:

1. A method for improving head position determination in a disk drive having a transducer head and a rotating disk with a plurality of embedded servo wedges for defining a plurality of concentric data tracks, each servo wedge having a plurality of servo bursts for providing radial track position information, the method comprising:
   reading the servo bursts within a servo wedge and determining a burst amplitude for each servo burst;
   comparing the burst amplitudes to determine a radial servo position zone;
   determining a fine radial head position within the radial servo position zone based on a ratio having a numerator consisting of an algebraic sum and difference of the burst amplitudes and a denominator consisting of an algebraic difference between a largest burst amplitude and a smallest burst amplitude.

2. A method for improving head position determination as defined in claim 1, wherein the plurality of servo bursts within the servo wedge comprise four (4) servo bursts for each set of an odd data track and an even data track.

3. A method for improving head position determination as defined in claim 2, wherein the four servo bursts generate first, second, third and fourth burst amplitudes, the first burst amplitude being greater than the second burst amplitude, the second burst amplitude being greater than the third burst amplitude, and the third burst amplitude being greater than the fourth burst amplitude, such that the first burst amplitude is the largest burst amplitude and the fourth burst amplitude is the smallest burst amplitude.

4. A method for improving head position determination as defined in claim 3, wherein the algebraic sum and difference of the burst amplitudes of the numerator consists of the first burst amplitude plus the third burst amplitude minus the second burst amplitude and minus the fourth burst amplitude.

5. A method for improving head position determination as defined in claim 3, wherein the algebraic sum and difference of the burst amplitudes of the numerator consists of the second burst amplitude plus the fourth burst amplitude minus the first burst amplitude and minus the third burst amplitude.

6. A method for improving head position determination as defined in claim 2, wherein each servo burst has a circumferential offset for identifying the servo burst and a radial offset for providing radial track position information.

7. A method for improving head position determination as defined in claim 1, wherein eight radial servo position zones are associated with each set of an odd data track and an even data track.

8. A method for improving head position determination as defined in claim 1, wherein four radial servo position zones are associated with each data track.

9. A method for improving head position determination in a disk drive having a transducer head and a rotating disk with a plurality of embedded servo wedges for defining a plurality of concentric data tracks, each servo wedge having an A servo burst, a B servo burst, a C servo burst and a D servo burst for providing radial track position information, the method comprising:
   reading the servo bursts within a servo wedge and determining a burst amplitude for each servo burst;
   comparing the burst amplitudes to determine one of eight radial servo position zones;
   determining a fine radial head position P1 within a first radial servo position zone or a fifth radial servo position zone based on the following equation:

$P1=K(A-B-C+D)/(-A+B)$;

determining a fine radial head position P2 within a second radial servo position zone or a sixth radial servo position zone based on the following equation:

$P2=K(A-B-C+D)/(-C+D)$;

determining a fine radial head position P3 within a third radial servo position zone or a seventh radial servo position zone based on the following equation:

$P3=K(A-B+C-D)/(-C+D)$; and determining a fine radial head position P4 within a fourth radial servo position zone or an eighth radial servo position zone based on the following equation:

$P4=K(-A+B-C+D)/(-A+B)$.

10. A method for improving head position determination as defined in claim 9, wherein K is a position value for a quarter track position.

11. A method for improving head position determination as defined in claim 9, wherein the fine radial head position is a value between −64 and 64, and K is equal to 64.

12. A method for improving head position determination as defined in claim 9, wherein for comparing the burst amplitudes:
   the first radial servo position zone is used if the burst amplitude comparison determines that D>C, B>A and B>D;
   the second radial servo position zone is used if the burst amplitude comparison determines that D>C, B>A and B<D;

the third radial servo position zone is used if the burst amplitude comparison determines that D>C, A>B and D>A;

the fourth radial servo position zone is used if the burst amplitude comparison determines that D>C, A>B and D<A;

the fifth radial servo position zone is used if the burst amplitude comparison determines that C>D, A>B and A>C;

the sixth radial servo position zone is used if the burst amplitude comparison determines that C>D, A>B and A<C;

the seventh radial servo position zone is used if the burst amplitude comparison determines that C>D, B>A and C>B; and the eighth radial servo position zone is used if the burst amplitude comparison determines that C>D, B>A and C<B.

13. A disk drive comprising:

a transducer head;

a rotating disk with a plurality of embedded servo wedges for defining a plurality of concentric data tracks, each servo wedge having a plurality of servo bursts for providing radial track position information;

means for reading the servo bursts within a servo wedge and determining a burst amplitude for each servo burst;

means for comparing the burst amplitudes to determine a radial servo position zone;

means for determining a fine radial head position within the radial servo position zone based on a ratio having a numerator consisting of an algebraic sum and difference of the burst amplitudes and a denominator consisting of an algebraic difference between a largest burst amplitude and a smallest burst amplitude.

14. A disk drive as defined in claim 13, wherein the plurality of servo bursts within the servo wedge comprise four servo bursts for each set of an odd data track and an even data track.

15. A disk drive as defined in claim 14, wherein each servo burst has a circumferential offset for identifying the servo burst and a radial offset for providing radial track position information.

16. A disk drive as defined in claim 13, wherein eight radial servo position zones are associated with each set of an odd data track and an even data track.

17. A disk as defined in claim 13, wherein four radial servo position zones are associated with each data track.

18. A disk drive, comprising: a transducer head;

a rotating disk with a plurality of embedded servo wedges for defining a plurality of concentric data tracks, each servo wedge having an A servo burst, a B servo burst, a C servo burst and a D servo burst for providing radial track position information;

means for reading the servo bursts within a servo wedge and determining a burst amplitude for each servo burst;

means for comparing the burst amplitudes to determine one of eight radial servo position zones;

means for determining a fine radial head position P1 within a first radial servo position zone or a fifth radial servo position zone based on the following equation:

$$P1=K(A-B-C+D)/(-A+B);$$

means for determining a fine radial head position P2 within a second radial servo position zone or a sixth radial servo position zone based on the following equation:

$$P2=K(A-B-C+D)/(-C+D);$$

means for determining a fine radial head position P3 within a third radial servo position zone or a seventh radial servo position zone based on the following equation:

$$P3=K(A-B+C-D)/(-C+D);\text{ and}$$

means for determining a fine radial head position P4 within a fourth radial servo position zone or an eighth radial servo position zone based on the following equation:

$$P4=K(-A+B-C+D)/(-A+B).$$

19. A disk drive as defined in claim 18, wherein K is a position value for a quarter track position.

20. A disk drive as defined in claim 18, wherein the fine radial head position is a value between −64 and 64, and K is equal to 64.

21. A disk drive as defined in claim 18, wherein:

the first radial servo position zone is used if the means for comparing the burst amplitudes determines that D>C, B>A and B>D;

the second radial servo position zone is used if the means for comparing the burst amplitudes determines that D>C, B>A and B<D;

the third radial servo position zone is used if the means for comparing the burst amplitudes determines that D>C, A>B and D>A;

the fourth radial servo position zone is used if the means for comparing the burst amplitudes determines that D>C, A>B and D<A;

the fifth radial servo position zone is used if the means for comparing the burst amplitudes determines that C>D, A>B and A>C;

the sixth radial servo position zone is used if the means for comparing the burst amplitudes determines that C>D, A>B and A<C;

the seventh radial servo position zone is used if the means for comparing the burst amplitudes determines that C>D, B>A and C>B; and the eighth radial servo position zone is used if the means for comparing the burst amplitudes determines that C>D, B>A and C<B.

* * * * *